United States Patent
Obana et al.

[11] Patent Number: 6,102,095
[45] Date of Patent: Aug. 15, 2000

[54] CORROSION RESISTANT STEEL CORDS AND PNEUMATIC TIRES REINFORCED WITH SAME

[75] Inventors: Naohiko Obana; Yoshikazu Kaneko, both of Kuroiso; Ryuzo Osawa, Kodaira, all of Japan

[73] Assignees: Bridgestone Corporation; Bridgestone Metalpha Corporation, both of Tokyo, Japan

[21] Appl. No.: 08/952,500

[22] PCT Filed: Apr. 18, 1997

[86] PCT No.: PCT/JP97/01338
§ 371 Date: Nov. 24, 1997
§ 102(e) Date: Nov. 24, 1997

[87] PCT Pub. No.: WO97/39176
PCT Pub. Date: Oct. 23, 1997

[30] Foreign Application Priority Data

Apr. 18, 1996 [JP] Japan .................................. 8-096861

[51] Int. Cl.[7] .............................. B60C 9/00; D07B 1/06; D07B 1/08; D07B 1/10
[52] U.S. Cl. ............................. 152/527; 57/200; 57/212; 57/213; 57/9; 57/311; 57/902; 152/451; 152/556
[58] Field of Search ..................... 152/451, 527, 152/556; 57/902, 311, 9, 206, 212, 213, 216, 236, 237, 200; 216/100, 108, 52, 53

[56] References Cited

U.S. PATENT DOCUMENTS 4,781,016  11/1988  Sato et al. .
5,806,296  9/1998  Kaneko et al. ...................... 57/311 X
5,873,962  2/1999  Kaneko et al. ...................... 152/556

FOREIGN PATENT DOCUMENTS 0 301 776   2/1989  European Pat. Off. .
57-149578   9/1982  Japan .
5-46997     6/1993  Japan .
6-33147     2/1994  Japan .
2 034 363   6/1980  United Kingdom .
2 092 629   8/1982  United Kingdom .

*Primary Examiner*—Adrienne C. Johnstone
*Attorney, Agent, or Firm*—Sughrue, Mion, Zinn, Macpeak & Seas, PLLC

[57] ABSTRACT

A corrosion resistant steel cord for reinforcing rubber articles, particularly a belt and/or carcass of a pneumatic tire, has a residual compressive stress inside the twisting helix of each steel filament such that a ratio $R_1/R_0$ is less than one, where $R_0$ is the radius of curvature of a helix in each helically formed steel filament obtained by untwisting of the cord and $R_1$ is the radius of curvature of the helix after removal of a surface layer from the inside of the helix in the steel filament. The steel filaments have a tensile strength of 4,000–4,800 $N/mm^2$. The cord does not have a wrapping wire around its outer peripheral surface and has either a single twisted construction obtained by twisting 3 to 6 steel filaments in an open structure having a space between adjacent filaments or a two-layer twisted construction obtained by surrounding a core of n=1–4 steel filaments with a sheath of n+(2–6) steel filaments in a rubber penetration structure having a space between adjacent filaments of the sheath or a three-layer twisted construction obtained by surrounding a core of a single steel filament with a first sheath of m=3–6 steel filaments and a second sheath of m+(2–6) steel filaments in a rubber penetration structure having a space between adjacent filaments of each sheath.

21 Claims, 4 Drawing Sheets

FIG. 2
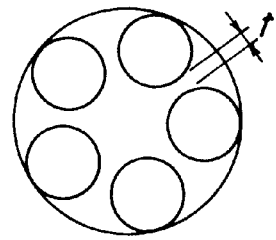
FIG. 3
(a)
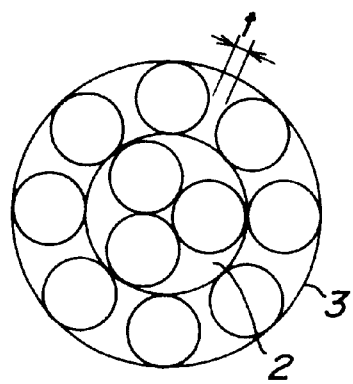
(b)
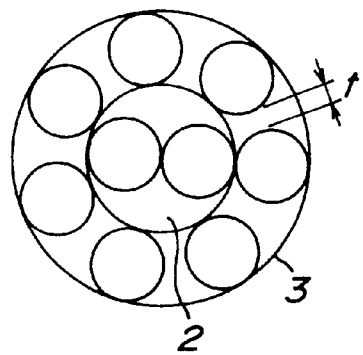
(c)
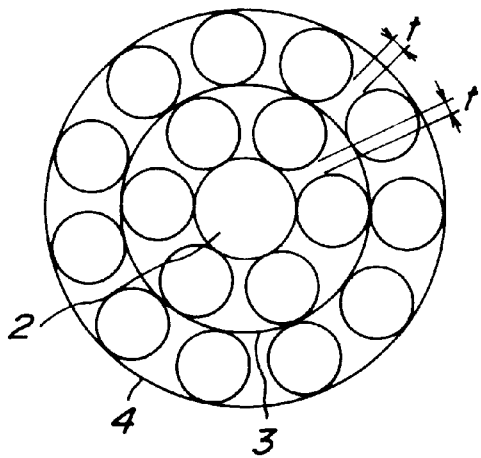
(d)
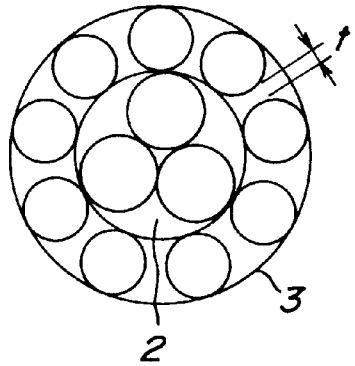

FIG. 6
(a)
(b)
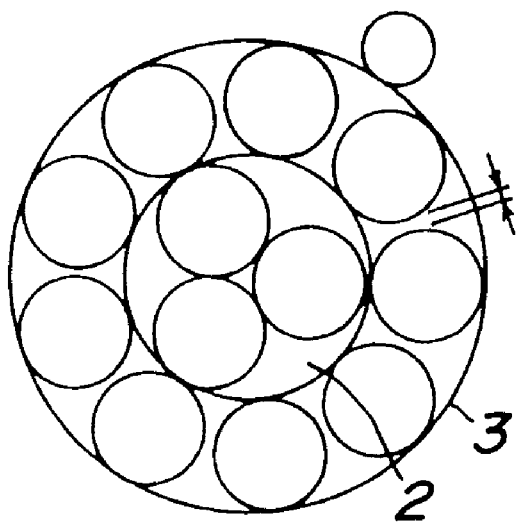
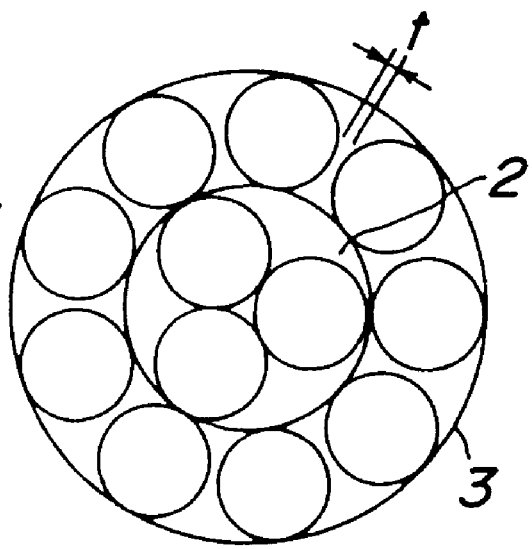

CORROSION RESISTANT STEEL CORDS AND PNEUMATIC TIRES REINFORCED WITH SAME

TECHNICAL FIELD

This invention relates to steel cords for the reinforcement of rubber articles such as pneumatic tires, industrial belts and the like as well as pneumatic tires having weight reduction and improved durability by using such steel cords in at least one of carcass and belt.

BACKGROUND ART

Even in the field of pneumatic tires as a typical example of rubber articles, the weight reduction of the tire is recently progressing for contributing to low fuel consumption of a vehicle in view of global environmental protection. This is true even when steel cords are used as a reinforcement for the tire. That is, it is attempted to decrease the amount of steel cords used for reducing total weight of carcass or belt by increasing the strength of the cord while maintaining the strength of the tire.

However, if it is intended to increase the tensile strength per unit section area of a steel filament constituting the steel cord, the weight reduction of the tire is realized, but the resistance to corrosion fatigue is degraded. Hence there is caused a problem that the durability of the cord and hence the durability of the rubber article such as tire or the like are lowered.

That is, the tire may be sometimes subjected to cut failure arriving at the vicinity of the steel cord through protrusions and foreign matter on a road surface or a roadside edge and hence the steel filaments constituting the cord are exposed to corrosion environment through water penetrating into such a cut failure to lower the durability of the tire. This phenomenon becomes conspicuous as the tensile strength of the cord becomes higher.

As a countermeasure, there is known a method wherein the forming ratio of the steel filament is made large to form a space between the steel filaments in case of steel cord having a single twisted construction, or the number of steel filaments constituting a sheath is decreased to form a space between the steel filaments in case of steel cord having a layer twisting construction, whereby the steel cord is rendered into a so-called rubber-penetration structure provided with the space capable of inserting rubber into the inside of the cord to prevent the penetration of water into the inside of the cord and hence control the corrosion of the steel filaments.

Even if rubber penetration is sufficient, however, the corrosion of the steel filament may be progressed by water included in rubber, so that the resistance to corrosion fatigue is not necessarily improved even by the above rubber-penetration structure.

Further, JP-A-57-149578 proposes a method wherein the fatigue resistance is improved by alternately conducting bending-unbending treatments to uniformly disperse residual compression stress over a full peripheral surface of a wire. In the cord having a high tensile strength, however, the elastic limit is high, so that there is a disadvantage that the effect by the bending-unbending treatments is not sufficiently developed.

DISCLOSURE OF INVENTION

It is, therefore, an object of the invention to provide steel cords for use in rubber articles, particularly carcass or belt of a pneumatic tire which can avoid a problem that the lowering of the resistance to corrosion fatigue is produced when the tensile strength of the steel filament constituting the cord is increased.

That is, the invention lies in a steel cord for the reinforcement of rubber article having a single twisted construction obtained by twisting 3 to 6 steel filaments each having a tensile strength of 4000–4800 N/mm$^2$ and an open type structure having a space between adjacent steel filaments without winding a wrapping wire around the outer peripheral surface thereof, in which radius of curvature $R_0$ of a helix in each helically formed steel filament obtained by untwisting of the cord to radius of curvature $R_1$ of helix after the removal of a surface layer from the inside of the helix in the steel filament satisfy a ratio of $R_1/R_0$ of less than 1.

In this case, it is advantageous that a space between mutually adjacent steel filaments is not less than 0.02 mm on average but not more than 1.5 times a diameter of the steel filament for penetrating rubber into the inside of the cord, and it is useful that the steel filament has a carbon content of not less than 0.70% by weight and a diameter of 0.15–0.28 mm for improving the cord tenacity.

Furthermore, the invention lies in a steel cord for the reinforcement of rubber article having a two-layer twisting construction obtained by surrounding a core comprised of n steel filaments (n=1~4) each having a tensile strength of 4000–4800 N/mm$^2$ with a sheath comprised of n+(2~6) steel filaments each having a tensile strength of 4000–4800 N/mm$^2$ and a rubber penetration type structure having a space between adjacent steel filaments of the sheath without winding a wrapping wire around the outer peripheral surface thereof, in which radius of curvature $R_0$ of a helix in each helically formed steel filament obtained by untwisting of the cord to radius of curvature $R_1$ of helix after the removal of a surface layer from the inside of the helix in the steel filament satisfy a ratio of $R_1/R_0$ of less than 1; and a steel cord for the reinforcement of rubber article having a three-layer twisting construction obtained by surrounding a core comprised of a single steel filament having a tensile strength of 4000–4800 N/mm$^2$ with a first sheath comprised of m steel filaments (m=3~6) each having a tensile strength of 4000–4800 N/mm2 and arranging a second sheath comprised of m+(2~6) steel filaments each having a tensile strength of 4000–4800 N/mm$^2$ and a rubber penetration type structure having a space between adjacent steel filaments of the sheath without winding a wrapping wire around the outer peripheral surface thereof, in which radius of curvature $R_0$ of a helix in each helically formed steel filament obtained by untwisting of the cord to radius of curvature $R_1$ of helix after the removal of a surface layer from the inside of the helix in the steel filament satisfy a ratio of $R_1/R_0$ of less than 1.

The term "rubber penetration type structure" used herein means a structure that the space between the steel filaments constituting the sheath in the two-layer twisting construction or three-layer twisting construction and rubber can penetrate into the cord through the space.

In this case, it is advantageous that a space between mutually adjacent steel filaments is not less than 0.02 mm on average but not more than 1.5 times a diameter of the steel filament for penetrating rubber into the inside of the cord, and it is useful that the steel filament has a carbon content of not less than 0.70% by weight and a diameter of 0.15–0.23 mm for improving the cord tenacity.

Further, it is advantageous that the surface layer to be removed by dissolution from the inside of the helix in the steel filament is a depth corresponding to 5% of the diameter of the steel filament, or further 10% thereof for particularly improving the resistance to corrosion fatigue.

Moreover, the invention lies in a pneumatic tire comprising a carcass toroidally extending between a pair of bead portions and a belt superimposed about a crown portion of the carcass and comprised of at least two belt layers, in which the above-defined steel cords are used as a cord constituting at least one of the carcass and the belt.

In this case, it is advantageous that the steel cords are applied so that a distance between adjoining cords is 0.6–0.9 mm in a layer of material as a starting material for the carcass of the tire.

The steel cord according to the invention is a steel cord having a single twisted construction obtained by twisting 3~6 steel filaments, a steel cord having a two-layer twisting construction obtained by surrounding a core comprised of n steel filaments (n=1~4) with a sheath comprised of n+(2~6) steel filaments, or a steel cord having a three-layer twisting construction obtained by surrounding a core of a single steel filament with a first sheath comprised of m steel filaments (m=3~6) and arranging a second sheath comprised of m+(2~6) steel filaments around the first sheath. In this case, it is important that radius of curvature $R_0$ of a helix in each helically formed steel filament obtained by untwisting of the cord to radius of curvature $R_1$ of helix after the removal of a surface layer from the inside of the helix in the steel filament satisfy a ratio $R_1/R_0$ of a given range.

In FIG. 1(a) is shown a helically formed steel filament 1 obtained by untwisting of the steel cord, in which a helix of the steel filament 1 has a radius of curvature $R_0$. As shown in FIG. 1(b), the helix after the removal of a surface layer from the inside of the helix in the steel filament 1 has a radius of curvature $R_1$. According to the invention, therefore, it is important that the ratio $R_1/R_0$ of both radii of curvature is less than 1.

In the invention, the ratio $R_1/R_0$ of radii of curvature is restricted to less than 1 for rationalizing stress distribution at the surface zone of the steel filament to compress residual stress of the surface zone at the inside of the helix in the steel filament. In general, each of the steel filaments obtained by untwisting of the steel cord has a helix form because the steel filament is subjected to plastic deformation at a twisting step for the formation of the cord by twisting straight steel filaments obtained at a drawing step. Even if residual tension stress badly exerting upon the resistance to corrosion fatigue is reduced from the surface of the steel filament at the drawing step, when such steel filaments are twisted to form the cord, residual tension stress is unavoidably produced in the inside of the helix through the plastic deformation. Hence it is difficult to improve the resistance to corrosion fatigue in the cord.

The reason why the residual tension stress at the surface obstructs the resistance to corrosion fatigue is due to the fact that the local formation of cell is first induced at the surface of the helix through such a stress to create an environment easily causing electrochemical corrosion. When pits are created by fretting and in the presence of water under such an environment, if there is residual stress, the stress concentrates in the pits to easily cause cracks.

In the steel cord according to the invention, the residual stress at the inside of the helix in the steel filament is switched from the tension side to the compression side to improve the resistance to corrosion fatigue. That is, the feature that the residual stress at the inside of the helix in the steel filament is existent in the compression side can be defined by the fact that the radius of curvature $R_1$ after the removal of the surface layer from the inside of the helix is made smaller than the radius of curvature $R_0$ before the dissolution or the ratio $R_1/R_0$ is less than 1, whereby the invention has been accomplished.

In general, the elastic limit of the steel filament rises as the tensile strength of the steel filament increases, so that it is difficult to shift the residual stress from tension side to compression side through plastic deformation treatment. Particularly, when the tensile strength is not less than 4000 $N/mm^2$, the plastic deformation treatment is very difficult. On the contrary, in order to obtain cords in which the ratio $R_1/R_0$ in the steel filament is less than 1, the inventors have newly established a method wherein the cord is obtained, for example by twisting steel filaments and then passed through correction rolls under tension, during which it is subjected to such a treatment that a sum σ of bending stress B to the steel filament and tensile stress T to the steel filament through the rolls is not more than 80% but less than 100% of the tensile strength of the steel filament and a ratio of T in the sum σ is not less than 80% but less than 95% to thereby reduce residual tensile stress in the inside of helix of the steel filament. According to this method, the invention becomes applicable even to steel filaments having a tensile strength of not less than 4000 $N/mm^2$, which could not be subjected to the conventional plastic deformation treatment.

When a vehicle provided with the pneumatic tires is run, the steel cord for the reinforcement of the tire is subjected to repetitive bending and hence the steel filaments constituting the cord are worn by fretting to further cause corrosion fatigue. In the steel cord for the reinforcement of the tire, therefore, it is favorable that the radius of curvature of the helix after the removal of the surface layer corresponding to 5% of the filament diameter satisfies the above relation, and particularly the radius of curvature of the helix after the removal of the surface layer corresponding to 10% of the filament diameter satisfies the above relation. In other words, the invention is to minimize residual tension stress at a region from the surface of the steel filament to a depth corresponding to 5%, more particularly 10% of the filament diameter as far as possible.

If the progress of the wear through fretting is fast, however, the mechanical wear precedes the corrosion to prematurely wear and lose the reducing region of residual tension stress in the surface layer of the steel filament and hence there is caused a fear of developing no reducing effect of residual tension stress. Therefore, it is important that the technique of restricting the ratio $R_1/R_0$ to less than 1 is applied to cords causing no fretting or cords having a structure that the occurrence of the fretting is very gentle.

In the cords of the single twisted construction or two- or three-layer twisting construction according to the invention, fretting is avoided and the effect of reducing the residual tension stress at the ratio $R_1/R_0$ of less than 1 is sufficiently developed by the features that the space between the adjacent steel filaments in the single twisted construction or the space between the adjacent steel filaments in the sheath of the layer twisting construction is not less than 0.02 mm on average but not more than 1.5 times the diameter of the steel filament and the wrapping wire is not wound around the outer peripheral surface of the cord.

That is, the steel cord according to the invention is required to adopt an adequate twisting construction from a viewpoint of rubber penetrability and fatigue resistance when being used as a reinforcement for rubber articles and is the steel cord of the single twisted construction obtained by twisting 3~6 steel filaments, the steel cord of the two-layer twisting construction obtained by surrounding a core comprised of n steel filaments (n=1~4) with a sheath comprised of n+(2~6) steel filaments, or the steel cord of the three-layer twisting construction obtained by surrounding a core of a single steel filament with a first sheath comprised of m steel filaments (m=3~6) and arranging a second sheath comprised of m+(2~6) steel filaments around the first sheath as previously mentioned.

For example, there are recommended steel cords having the single twisted construction exemplified by 1×5 construction as shown in FIG. 2, or various layer twisting constructions as shown in FIGS. 3(a) to (d). In FIG. 3, numeral 2 is a core, and numerals 3 and 4 are sheaths, respectively.

These cord constructions are effective to improve the fatigue resistance while satisfying rubber penetrability and to increase the filling ratio of the steel filaments in section of the cord to thereby provide a desired cord tenacity with a minimum cord diameter. In the steel cord of the two-layer twisting construction, therefore, it is preferable that the number of the steel filaments constituting the core is 1 or 2 having no space therein, or 3 having a minimum space therein.

In order to ensure rubber penetrability for avoiding fretting, it is favorable that a space t between the adjacent steel filaments in the single twisted construction as shown in FIG. 2 or a space t between the adjacent steel filaments constituting the sheath in the layer twisting construction as shown in FIG. 3 is not less than 0.02 mm on average but not more than 1.5 times the filament diameter as previously mentioned.

When the space t is less than 0.02 mm, it is difficult to penetrate rubber into the inside of the cord in the vulcanization for tire building-up. When it exceeds 1.5 times the filament diameter, the disorder in the arrangement of the steel filaments is caused to lower the fatigue resistance and also the filling ratio of the steel filaments in the circumscribed section of the cord is lowered to make the cord tenacity lacking or increase the cord diameter and hence a treat material for the carcass or belt in the tire (i.e. a rubberized layer of parallel steel cords) becomes too thick for reducing the tire weight.

In the invention, the steel filament constituting the steel cord has a tensile strength of 4000–4800 N/mm$^2$. When the tensile strength is less than 4000 N/mm$^2$, the cord tenacity is lacking and the reduction of tire weight cannot be attained while maintaining the tire strength. Further, when the diameter of the steel filament constituting the cord is made thick for maintaining the cord tenacity, if a large bending input is applied to the cord in the running under a low internal pressure represented by so-called run-flat running or the like, initial breakage is liable to be caused in the steel filament constituting the cord. When the tire is used at such a state by again inflating it, the possibility of inducing tire burst becomes higher. In this point, according to the invention, the diameter of the steel filament can be made small by rendering the tensile strength of the steel filament into not less than 4000 N/mm$^2$ and hence the performance of the tire under a low internal pressure can be improved to enhance the safety.

When the tensile strength of the steel filament exceeds 4800 N/mm$^2$, the drawing productivity is considerably lowered and the resulting steel filament is poor in the ductility.

In order to obtain the tensile strength of 4000–4800 N/mm$^2$, the steel filament is advantageous to have a carbon content of not less than 0.7% by weight, preferably not less than 0.75% by weight. Moreover, when the carbon content exceeds 0.90% by weight, free cementite is produced in the patenting and hence the ductility of the steel filament can not be ensured. Incidentally, it is favorable to use steel material containing C: 0.80–0.85% by weight in order to control the rise of the cord cost.

When the diameter of the steel filament is less than 0.15 mm in the cord of single twisted construction, the tensile strength of the steel filament rises, but the productivity at the drawing step economically lowers, while when it exceeds 0.28 mm, the repetitive bending fatigue property is degraded and the bending rigidity of the steel cord becomes too large and hence the work in the tire building-up, particularly the work of the bead portion is difficult. In the cords of layer twisting construction, the number of steel filaments constituting the cord is large as compared with the cord of the single twisted construction and even if the steel filament is made thin, it is possible to maintain the strength of the tire, so that the disadvantages produced when the diameter of the steel filament is made thick as mentioned above can be avoided by rendering the diameter of the steel filament into not more than 0.23 mm. Incidentally, the diameter of the steel filament is not necessarily the same, but the productivity can be enhanced when the filament diameters are the same.

Since the wrapping wire to be wound around the outermost layer of the steel cord is not used in the steel cords of not only the single twisted construction but also the layer twisting construction according to the invention, the fretting between the steel filament in the outermost layer and the wrapping wire can be prevented, so that the lowering of the cord tenacity is very small even when the tire is used over a long period of time and also the diameter of the cord is made small to advantageously contribute to the reduction of the tire weight.

On the other hand, when the above-defined steel cords are used as a reinforcement in at least one of a carcass and a belt of a pneumatic tire comprising the carcass toroidally extending between a pair of bead portions and the belt superimposed about a crown portion of the carcass and comprised of at least two belt layers, the properties of the tire can be improved.

Particularly, when the steel cords are used in the carcass of the tire, it is preferable to apply the steel cords so that the distance between adjoining cords is 0.6–0.9 mm in the layer of material for the carcass. Concretely, it is favorable to apply the steel cords so that a diameter d (mm) and a cord tenacity of the steel cord satisfies a relation of $$0.6 \leq (50 \times \text{cord tenacity}/T) - d \leq 0.9$$

with respect to a preset tenacity T per 50 mm of a width of a layer of material for the carcass mainly determined according to the specification of the tire. That is, the diameter and tensile strength of the steel filament and the cord construction may properly be determined so as to provide the diameter and cord tenacity of the steel cord satisfying the above equation.

This is due to the fact that the durability of the carcass is improved by rendering the distance between adjoining steel cords in the carcass of a product tire after the expansion in vulcanization of a green tire at the production of the tire within an adequate range. That is, when the cord distance in the treat material represented by (50×cord tenacity/T)−d is less than 0.6 mm, the shearing stress of rubber becomes too large at an end portion of the carcass in the vicinity of the bead portion during the running of the tire and hence it is apt to create cracks in rubber between the cords and cause adhesion breakage between cord and rubber. When it exceeds 0.9 mm, the outward blistering of rubber between the cords in the radial direction is created in the air inflation of the tire to increase heat generation of rubber during the running of the tire and hence high-speed durability of the tire lowers.

BRIEF DESCRIPTION OF THE DRAWINGS

FIG. 2 is a schematically section view of a steel cord having a single twisted construction;

FIGS. 3(a) through 3(d) are each a schematically section view of a steel cord having a layer twisting construction;

FIGS. 6(a) and 6(b) are schematically section views illustrating constructions of the conventional and comparative steel cords.

BEST MODE FOR CARRYING OUT INVENTION

Figure 1:
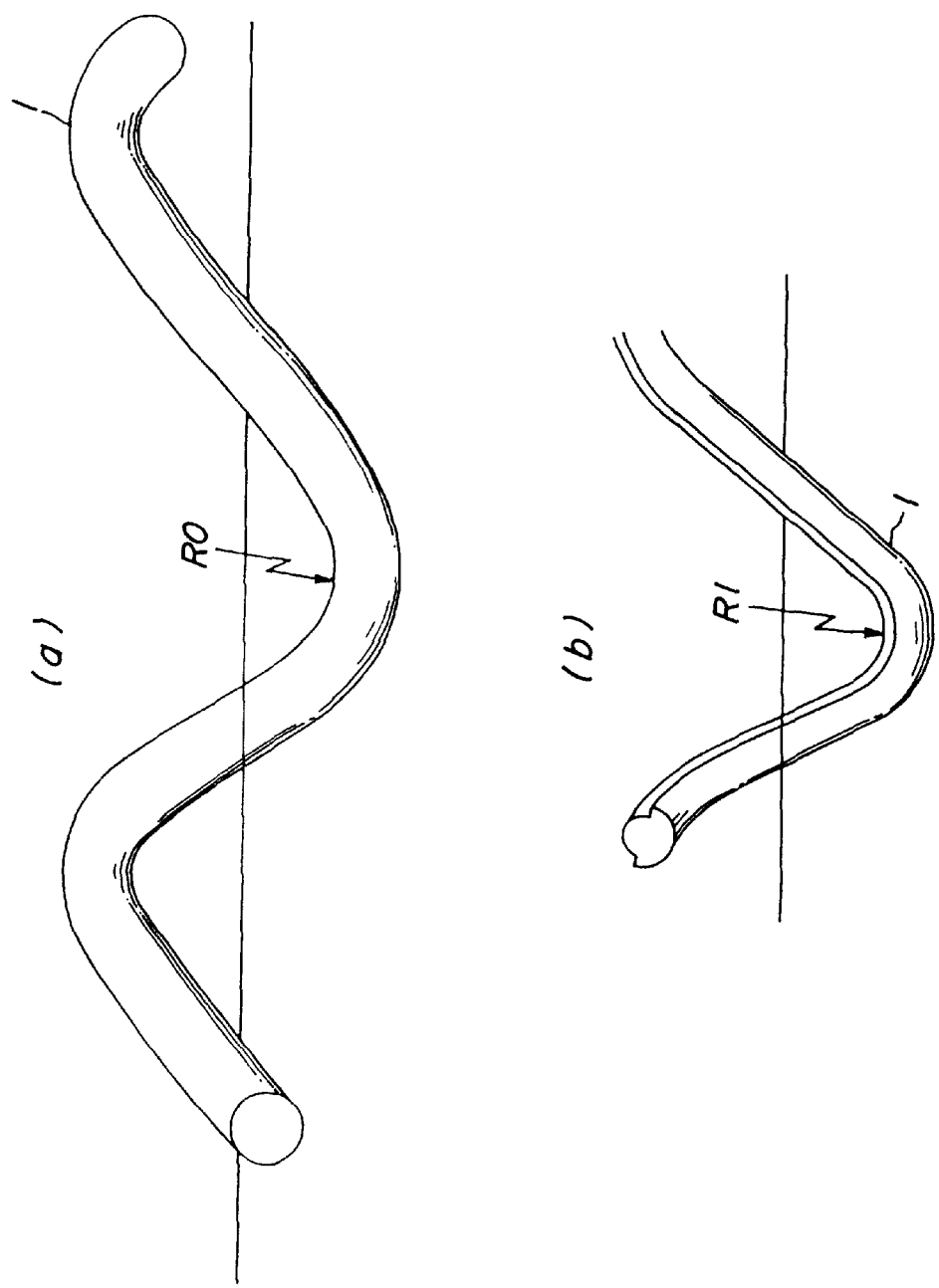
FIGS. 1(a) and 1(b) are each a diagrammatic view illustrating a shape before and after the removal of a surface layer from an inside of a helix with respect to a steel filament obtained by untwisting of a steel cord.

Various steel filaments having diameters and tensile strengths shown in Tables 1–4 are produced by subjecting a steel wire (diameter: 5.5 mm) having C: 0.70–0.85% by weight, Si: 0.23% by weight, Mn: 0.49% by weight, P: 0.006% by weight and S: 0.008% by weight to dry drawing, patenting, brass plating and wet drawing in this order.

Then, steel cords having various constructions shown in Tables 1–4 are produced by usual manner using a tubular twisting machine or a buncher twisting machine. The steel cord produced in the tubular twisting machine is subjected to such a treatment that in order to reduce the residual tensile stress in the inside of the helix of the steel filament constituting the steel cord, two or more straightening rollers having a large diameter are arranged in zigzag form and the steel cord is passed through these straightening rollers under a tensile stress higher than usual level. On the other hand, when the steel cord is produced by using the buncher twisting machine, the steel filaments are subjected to a treatment of applying a tensile stress higher than the usual level at the step of twisting them with torsion. In any case, $R_1/R_0$ in the steel filament is variously varied by properly changing the conditions of these treatments.

That is, when the above treatment applied to the steel cord produced in the tubular twisting machine is concretely described with respect to the steel cord of 3+8×0.19 mm shown as Invention Example 1 in Table 1, $R_1/R_0$ of this cord is rendered into less than 1 by zigzag arranging at least two, preferably not less than 3 straightening rollers of 60 mm in diameter and passing through these straightening rollers under a tensile stress of 2900 N/mm². On the other hand, in Comparative Example 4 using the same steel cord, when the cord is passed through 2 or 3 or more zigzag arranged straightening rollers of 10 mm in diameter under a tensile stress of 660 N/mm², $R_1/R_0$ of less than 1 is not obtained and hence the residual tensile stress in the inside of helix of the steel filament is not sufficiently reduced.

Also, when the buncher twisting machine is used in Invention Example 1, $R_1/R_0$ of the steel filament is rendered into less than 1 by applying a tensile stress of 830 N/mm² to the steel filament constituting the sheath in the bundling and twisting of the steel filaments. On the other hand, when the twisting of the steel filaments as the sheath is carried out under the conventional tensile stress of about 290 N/mm², $R_1/R_0$ of less than 1 is not obtained, but when it is subsequently subjected to the above treatment with the straightening rollers, $R_1/R_0$ of less than 1 is attained.

The steel filament used in Invention Example 1 having a fine diameter of 0.19 mm and a high tensile strength of 4120 N/mm² can be obtained by subjecting a wire material, which is subjected to, for example, brass plating and has a tensile strength of 1275 N/mm², to wet drawing to provide a total area reduction ratio of 98.3% according to a pass schedule using such a die to be set in each pass that a die used in a wire drawing at a true strain e represented by the following equation (1) of less than 0.75 adjusts an area reduction ratio represented by the following equation (2) to (22.67 ϵ+3)~29% and a die used in a wire drawing at a true strain ϵ of 0.75~2.25 adjusts an area reduction ratio to 20–29% and a die used in a wire drawing at a true strain ϵ of more than 2.25 adjusts an area reduction ratio to (−5.56ϵ+32.5)~(−6.22ϵ+43)%, or concretely a pass schedule of dies shown in Table 5.

$$\epsilon = 2 \cdot \ln(d_0/d_1) \quad (1)$$

wherein $d_0$: diameter of steel filament before drawing (mm)

Figure 4:
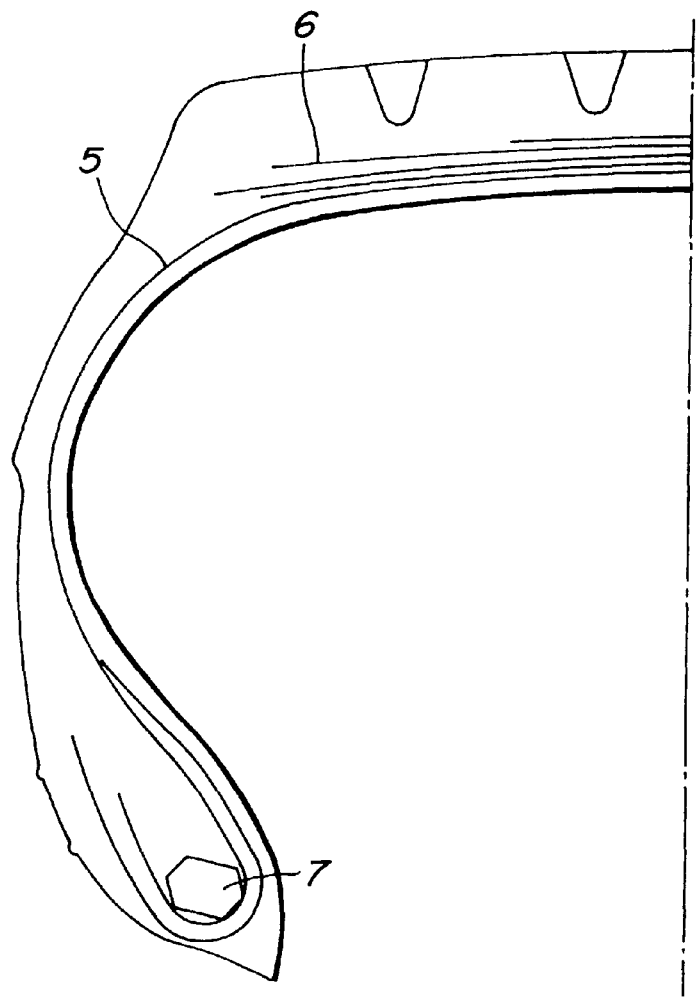
FIG. 4 is a diagrammatically radial-half section view of a pneumatic tire according to the invention.

$d_1$: diameter of steel filament after drawing (mm)

$$\text{(area reduction ratio of die)} = \{1 - (A1/A0)\} \times 100 \quad (2)$$

wherein $A_0$: sectional area of steel filament before passing through die $A_1$: sectional area of steel filament after passing through die Various pneumatic radial tires for truck and bus having a tire size of 11/70R22.5 (14PR) are manufactured by using the thus obtained steel cords in a carcass 5 of the tire shown in FIG. 4 arranged at an inclination angle of 90° with respect to an equator of the tire. In FIG. 4, numeral 6 is a belt comprised of four belt layers, and numeral 7 is a bead core. Each of these tires is mounted onto a normal rim defined in JATMA YEAR BOOK 1996 and inflated under an air pressure corresponding to maximum loading ability at applied size and ply rating in the same JATAM YEAR BOOK, and then applied to various tests for rubber penetrability, retention of cord tenacity, resistance to corrosion fatigue and ratio of steel filament breakage in a large bending input.

That is, the steel cord is taken out from the tire after the vulcanization and then a ratio of portion covered with rubber to a full length of the steel cord is measured on the surface of the steel filament in case of the single twisted steel cord or on the surface of the core in case of the layer-twisted steel cord. The rubber penetrability is represented by ⊚ when the ratio is 90–100%, ○ when it is 80–89% and X when it is not more than 79%. Moreover, there is no problem in practical use when the ratio is not less than 80%.

The retention of cord tenacity is evaluated by calculating a ratio as percentage of tenacity of steel cord taken out from the tire after running on a drum under a design normal load over 100,000 km to tenacity of steel cord taken out from a new tire having the same specification. The larger the numerical value, the better the result.

Into the inside of the tire is poured 300 cc of water prior to the mounting onto the rim, and thereafter the tire is run on the drum in the same manner as described above to measure a running distance until the occurrence of steel cord breaking-up (CBU) in the carcass of the tire. The resistance to corrosion fatigue is evaluated by an index on the basis that the running distance of control tire (conventional example in Table 1) is 100. The larger the index value, the better the result.

After the tire is run on a drum, the air pressure is adjusted to 1 kgf/cm$^2$ (at a hot state), and then the tire is run on the drum over a distance of 5000 km under a large bending input condition of a load corresponding to the maximum loading ability, and thereafter 10 steel cords are taken out from the carcass of the dissected tire and the number of broken steel filaments is measured. The ratio of broken steel filament in the large bending input is evaluated by an index on the basis that the broken number of control tire (conventional example in Table 1, Comparative Example 5 in Table 2, Comparative Example 6 in Table 3, Comparative Example 7 in Table 4) is 100. The smaller the index value, the better the result.

The ratio $R_1/R_0$ in the radius of curvature of the steel filament is calculated by cutting the steel filaments constituting the outermost layer of the helically formed steel cord obtained by untwisting of the cord to a length of 100 mm, applying an enamel onto a half of a circular surface portion in the steel filament, immersing in an aqueous solution of 50% nitric acid to dissolve out the remaining half portion not covered with the enamel to a depth corresponding to 3% or 10% of the filament diameter, and then measuring radii of curvature before and after such a dissolution treatment.

Figure 5:
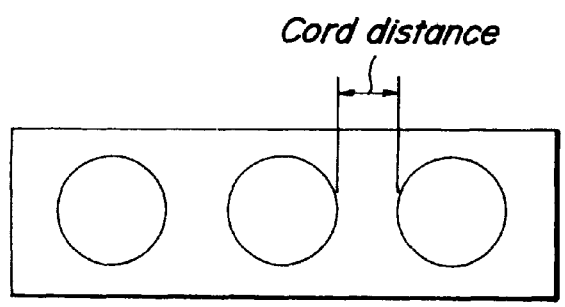
FIG. 5 is a partially schematic view illustrating a cord distance in a treat material before tire building-up.

The cord distance is measured in a layer of material before the tire building-up as shown in FIG. 5. The weight of steel cords used is represented by an index on the basis that the cord weight embedded in the carcass of control tire (conventional example in Table 1) is 100. The smaller the numerical value, the better the weight reduction.

The measured results are also shown in Tables 1~4. Moreover, the conventional example, comparative examples and invention examples of steel cord having a two-layer twisting construction with a core comprised of 3 filaments are shown in Table 1, and a comparative example and an invention example of steel cord having a two-layer twisting construction with a core comprised of 2 filaments are shown in Table 2, and a comparative example and an invention example of steel cord having a single twisted construction are shown in Table 3, and a comparative example and an invention example of steel cord having a three-layer twisting construction with a core comprised of one filament are shown in Table 4.

TABLE 1

|  | Conventional Example | Comparative Example 1 | Comparative Example 2 | Comparative Example 3 |
|---|---|---|---|---|
| Cord construction | 3 + 9 × 0.23 (mm) + 0.15(mm) | 3 + 9 × 0.21(mm) | 3 + 9 × 0.18(mm) | 3 + 8 × 0.21(mm) |
| Figure corresponding to cord construction | FIG. 6 (a) | FIG. 6 (b) | FIG. 6 (b) | FIG. 3 (a) |
| Twisting direction | S/S/Z | S/S | S/S | S/S |
| Pitch (mm) | 6.0/12.0/3.5 | 5.5/11.0 | 5.0/10.0 | 5.5/11.0 |
| Tensile strength of steel filament (N/mm$^2$) | 2940 | 2940 | 4090 | 3695 |
| cord tenacity (N/mm$^2$) | 1421 | 1185 | 1215 | 1365 |
| Space between steel filaments t (mm) | 0.019 | 0.017 | 0.015 | 0.044 |
| Ratio $R_1/R_0$ in radius of curvature at 3% depth | 1.05 | 1.01 | 1.03 | 0.91 |
| Ratio $R_1/R_0$ in radius of curvature at 10% depth | 1.12 | 1.03 | 1.07 | 0.92 |
| Cord distance (mm) | 0.70 | 0.50 | 0.66 | 0.71 |
| Weight of cord used (%) | 100 | 96.6 | 69.4 | 76.8 |
| Rubber penetrability | X | X | X | ○ |
| Retention of tenacity (%) | 90 | 94 | 97 | 97 |
| Resistance to corrosion fatigue | 100 | 105 | 101 | 129 |
| Index of steel filament breakage | 100 | 200 | 150 | 100 |

|  | Comparative Example 4 | Invention Example 1 | Invention Example 2 |
|---|---|---|---|
| Cord construction | 3 + 8 × 0.19(mm) | 3 + 8 × 0.19(mm) | 3 × 0.21(mm) + 9 × 0.18(mm) |
| Figure corresponding to cord construction | FIG. 3 (a) | FIG. 3 (a) | FIG. 3(d) |
| Twisting direction | S/S | S/S |  |
| Pitch (mm) | 5.0/10.0 | 5.0/10.0 | 5.0/10.0 |
| Tensile strength of steel filament (N/mm$^2$) | 4120 | 4120 | 4250 |
| cord tenacity (N/mm$^2$) | 1246 | 1246 | 1368 |
| Space between steel filaments t (mm) | 0.040 | 0.040 | 0.037 |

TABLE 1-continued

|  | | | |
|---|---|---|---|
| Ratio $R_1/R_0$ in radius of curvature at 3% depth | 1.05 | 0.90 | 0.92 |
| Ratio $R_1/R_0$ in radius of curvature at 10% depth | 1.04 | 0.89 | 0.92 |
| Cord distance (mm) | 0.66 | 0.66 | 0.78 |
| Weight of cord used (%) | 69.0 | 69.0 | 66.8 |
| Rubber penetrability | ○ | ○ | ○ |
| Retention of tenacity (%) | 96 | 97 | 97 |
| Resistance to corrosion fatigue | 100 | 130 | 128 |
| Index of steel filament breakage | 100 | 50 | 60 |

TABLE 2

|  | Comparative Example 5 | Invention Example 3 |
|---|---|---|
| Cord construction | 2 + 7 × 0.25 (mm) | 2 + 7 × 0.215 (mm) |
| Figure corresponding to cord construction | FIG. 3(b) | FIG. 3(b) |
| Twisting direction | S/S | S/S |
| Pitch (mm) | 6.0/12.0 | 6.0/12.0 |
| Tensile strength of steel filament (N/mm²) | 3500 | 4370 |
| Cord tenacity (N/mm²) | 1496 | 1393 |
| Space between steel filaments t (mm) | 0.076 | 0.065 |
| Ratio $R_1/R_0$ in radius of curvature at 3% depth | 0.92 | 0.93 |
| Ratio $R_1/R_0$ in radius of curvature at 10% depth | 0.96 | 0.90 |
| Cord distance (mm) | 0.74 | 0.75 |
| Weight of cord used (%) | 81.1 | 65.0 |
| Rubber penetrability | ◎ | ◎ |
| Retention of tenacity (%) | 96 | 97 |
| Resistance to corrosion fatigue | 124 | 125 |
| Index of steel filament breakage | 100 | 20 |

TABLE 3

|  | Comparative Example 6 | Invention Example 4 |
|---|---|---|
| Cord construction | 1 × 5 × 0.31 (mm) | 1 × 5 × 0.275 (mm) |
| Figure corresponding to cord construction | FIG. 2 | FIG. 2 |
| Twisting direction | S | S |
| Pitch (mm) | 12.0 | 9.5 |
| Tensile strength of steel filament (N/mm²) | 3800 | 4290 |
| Cord tenacity (N/mm²) | 1398 | 1234 |
| Space between steel filaments t (mm) | 0.075 | 0.066 |
| Ratio $R_1/R_0$ in radius of curvature at 3% depth | 0.95 | 0.94 |
| Ratio $R_1/R_0$ in radius of curvature at 10% depth | 0.98 | 0.94 |
| Cord distance (mm) | 0.69 | 0.62 |
| Weight of cord used (%) | 74.7 | 66.2 |
| Rubber penetrability | ◎ | ◎ |
| Retention of tenacity (%) | 97 | 98 |
| Resistance to corrosion fatigue | 120 | 122 |
| Index of steel filament breakage | 100 | 60 |

TABLE 4

|  | Comparative Example 7 | Invention Example 5 |
|---|---|---|
| Cord construction | 1 × 0.225 (mm) + (6 + 11) × 0.17 (mm) | 1 × 0.20 (mm) + (6 + 11) × 0.155 (mm) |
| Figure corresponding to cord construction | FIG. 3(c) | FIG. 3(c) |
| Twisting direction | —/S/Z | —/S/Z |
| Pitch (mm) | —/6.0/12.0 | —/6.0/12.0 |
| Tensile strength of steel filament (N/mm²) | 3730 | 4020 |
| Cord tenacity (N/mm²) | 1534 | 1376 |
| Space between steel filaments t (mm) | first sheath: 0.028 second sheath: 0.038 | first sheath: 0.023 second sheath: 0.033 |
| Ratio $R_1/R_0$ in radius of curvature at 3% depth | 0.90 | 0.91 |
| Ratio $R_1/R_0$ in radius of curvature at 10% depth | 0.88 | 0.86 |
| Cord distance (mm) | 0.88 | 0.78 |
| Weight of cord used (%) | 76.1 | 70.6 |
| Rubber penetrability | ◎ | ◎ |
| Retention of tenacity (%) | 95 | 96 |
| Resistance to corrosion fatigue | 128 | 128 |
| Index of steel filament breakage | 100 | 80 |

TABLE 5

| Pass No. | Filament diameter (mm) | Area reduction ratio (%) |
|---|---|---|
| 1 | 1.42 | 5.40 |
| 2 | 1.34 | 10.95 |
| 3 | 1.23 | 15.74 |
| 4 | 1.10 | 20.02 |
| 5 | 0.97 | 22.24 |
| 6 | 0.85 | 23.21 |
| 7 | 0.75 | 23.18 |
| 8 | 0.65 | 23.17 |
| 9 | 0.57 | 23.27 |
| 10 | 0.50 | 22.98 |
| 11 | 0.45 | 21.42 |
| 12 | 0.40 | 20.41 |
| 13 | 0.36 | 18.68 |
| 14 | 0.32 | 18.09 |
| 15 | 0.29 | 17.66 |
| 16 | 0.27 | 16.28 |
| 17 | 0.25 | 15.69 |
| 18 | 0.23 | 14.04 |
| 19 | 0.21 | 12.67 |
| 20 | 0.20 | 11.78 |
| 21 | 0.19 | 10.65 |

As seen from Tables 1~4, the tires using the steel cords according to the invention are excellent in the resistance to corrosion fatigue, and particularly the resistance to fretting fatigue is largely improved and hence the retention of the carcass strength is excellent. On the contrary, Comparative Examples 2 and 4 aim at the compression of the residual stress on the surface through the conventional system merely passing through straightening rollers, but since the residual stress of the surface layer at the inside of the helix is substantially tension, the improvement of resistance to corrosion fatigue is poor as compared with those in Invention Examples 1–5. Moreover, the invention examples and Comparative Example 2 develop the effect of directly reducing the weight of steel cords used by about 30% by increasing the tensile strength of the steel filament.

Although the cord construction is same between Comparative Example 3 and Invention Example 1, Comparative Example 5 and Invention Example 3, Comparative Example 6 and Invention Example 4 and Comparative Example 7 and Invention Example 5, the tensile strength of the steel filament is not less than 4000 N/mm² in the invention examples and less than 4000 N/mm² in the comparative examples, so that even if R1/R0 is less than 1, the comparative examples have a problem in the weight reduction. And also, the comparative examples are large in the filament diameter as compared with the invention examples, so that they are disadvantageous in a point that the breakage of the steel filament is apt to be caused in the large bending input.

Industrial Applicability

According to the invention, the strength of the steel cord can be increased without damaging the resistance to corrosion fatigue, so that when the steel cords are particularly applied to the pneumatic tire, it is possible to attain the reduction of the tire weight while maintaining the excellent durability.

We claim:

1. A corrosion resistant steel cord for the reinforcement of rubber articles the cord having a single twisted construction obtained by twisting 3 to 6 steel filaments each having a tensile strength of 4000–4800 N/mm² and an open structure having a space between adjacent steel filaments without winding a wrapping wire around the outer peripheral surface thereof, in which each steel filament is processed to have a residual compressive stress inside the twisting helix such that the ratio of a radius of curvature $R_0$ of a helix in each helically formed steel filament obtained by untwisting of the cord to a radius of curvature $R_1$ of the helix after the removal of surface layer from the inside of the helix in the steel filament satisfy $R_1/R_0 \leq 1$.

2. A corrosion resistant steel cord for the reinforcement of rubber articles according to claim 1, wherein the space between mutually adjacent steel filaments is not less than 0.02 mm on average but not more than 1.5 times a diameter of the steel filament for penetrating rubber into the inside of the cord.

3. A corrosion resistant steel cord for the reinforcement of rubber articles according to claim 1, wherein each steel filament has a carbon content of not less than 0.70% by weight and a diameter of 0.15–0.28 mm for improving the cord tenacity.

4. A corrosion resistant steel cord for the reinforcement of rubber articles according to claim 1, wherein the surface layer to be removed from the inside of the helix in each steel filament is removed by dissolution to a depth equal to 5% of the diameter of the steel filament.

5. A corrosion resistant steel cord for the reinforcement of rubber articles according to claim 1, wherein the surface layer to be removed from the inside of the helix in each steel filament is removed by dissolution to a depth equal to 10% of the diameter of the steel filament.

6. A corrosion resistant steel cord for the reinforcement of rubber articles, the cord having a two-layer twisting construction obtained by surrounding a core of n=1–4 steel filaments each having a tensile strength of 4000–4800 N/mm² with a sheath of n+(2–6) steel filaments each having a tensile strength of 4000–4800 N/mm² and a rubber penetration structure having a space between adjacent steel filaments of the sheath without winding a wrapping wire around the outer peripheral surface thereof, in which each steel filament is processed to have a residual compressive stress inside the twisting helix such that the ratio of a radius of curvature $R_0$ of a helix in each helically formed steel filament obtained by untwisting of the cord to a radius of curvature $R_1$ of the helix after the removal of a surface layer from the inside of the helix in the steel filament satisfy $R_1/R_0 \leq 1$.

7. A corrosion resistant steel cord for the reinforcement of rubber articles according to claim 6, wherein the space between mutually adjacent steel filaments of the sheath is not less than 0.02 mm on average but not more than 1.5 times a diameter of the steel filament for penetrating rubber into the inside of the cord.

8. A corrosion steel resistant cord for the reinforcement of rubber articles according to claim 6, wherein each steel filament has a carbon content of not less than 0.70% by weight and a diameter of 0.15–0.23 mm for improving the cord tenacity.

9. A corrosion resistant steel cord for the reinforcement of rubber articles, the cord having a three-layer twisting construction obtained by surrounding a core of a single steel filament having a tensile strength of 4000–4800 N/mm² with a first sheath of m=3–6 steel filaments each having a tensile strength of 4000–4800 N/mm² and arranging a second sheath of m+(2–6) steel filaments each having a tensile strength of 4000–4800 N/mm² and a rubber penetration structure having a space between adjacent steel filaments of each sheath without winding a wrapping wire around the outer peripheral surface thereof, in which each steel filament is processed to have a residual compressive stress inside the twisting helix such that the ratio of a radius of curvature $R_0$ of a helix in each helically formed steel filament obtained by untwisting of the cord to a radius of curvature $R_1$ of the helix after the removal of a surface layer from the inside of the helix in the steel filament satisfy $R_1/R_0 23\ 1$.

10. A pneumatic tire comprising; a carcass toroidally extending between a pair of bead portions and a belt superimposed about a crown portion of the carcass and comprised of at least two belt layers, corrosion resistant steel cords used as a cord constituting at least one of the carcass and the belt, each cord having a single twisted construction obtained by twisting 3 to 6 steel filaments each having a tensile strength of 4000–4800 N/mm² and an open structure having a space between adjacent steel filaments without winding a wrapping wire around the outer peripheral surface thereof, in which each steel filament is processed to have a residual compressive stress inside the twisting helix such that the ratio of a radius of curvature $R_0$ of a helix in each helically formed steel filament obtained by untwisting of the cord to a radius of curvature $R_1$ of the helix after the removal of a surface layer from the inside of the helix in the steel filament satisfy $R_1/R_0 \leq 1$.

11. A pneumatic tire according to claim 10, wherein the steel cords are applied so that a distance between adjoining cords is 0.6–0.9 mm in a layer of material as a starting material for the carcass of the tire.

12. A pneumatic tire according to claim 10, wherein the space between mutually adjacent steel filaments is not less than 0.02 mm on average but not more than 1.5 times a diameter of the steel filament for penetrating rubber into the inside of the cord.

13. A pneumatic tire according to claim 10, wherein each steel filament has a carbon content of not less than 0.70% by weight and a diameter of 0.15–0.28 mm for improving the cord tenacity.

14. A pneumatic tire comprising; a carcass toroidally extending between a pair of bead portions and a belt superimposed about a crown portion of the carcass and comprised of at least two belt layers, corrosion resistant steel cords used as a cord constituting at least one of the carcass and the belt, each cord having a two-layer twisting construction obtained by surrounding a core of n=1–4 steel filaments each having a tensile strength of 4000–4800 N/mm$^2$ with a sheath of n+(2–6) steel filaments each having a tensile strength of 4000–4800 N/mm$^2$ and a rubber penetration structure having a space between adjacent steel filaments of the sheath without winding a wrapping wire around the outer peripheral surface thereof, in which each steel filament is processed to have a residual compressive stress inside the twisting helix such that the ratio of a radius of curvature $R_0$ of a helix in each helically formed steel filament obtained by untwisting of the cord to a radius of curvature $R_1$ of the helix after the removal of a surface layer from the inside of the helix in the steel filament satisfy $R_1/R_0 \leq 1$.

15. A pneumatic tire according to claim 14, wherein the steel cords are applied so that a distance between adjoining cords is 0.6–0.9 mm in a layer of material as a starting material for the carcass of the tire.

16. A pneumatic tire comprising; a carcass toroidally extending between a pair of bead portions and a belt superimposed about a crown portion of the carcass and comprised of at last two belt layers, corrosion resistant steel cords used as a cord constituting at least one of the carcass and the belt, each cord having a three-layer twisting construction obtained by surrounding a core of a single steel filament having a tensile strength of 4000–4800 N/mm$^2$ with a first sheath of m=3–6 steel filaments each having a tensile strength of 4000–4800 N/mm$^2$ and arranging a second sheath of m+(2–6) steel filaments each having a tensile strength of 4000–4800 N/mm$^2$ and an rubber penetration structure having a space between adjacent steel filaments of each sheath without winding a wrapping wire around the outer peripheral surface thereof, in which each steel filament is processed to have a residual compressive stress inside the twisting helix such that the ratio of a radius of curvature $R_0$ of a helix in each helically formed steel filament obtained by untwisting of the cord to a radius of curvature $R_1$ of the helix after the removal of a surface layer from the inside of the helix in the steel filament satisfy $R_1/R_0 \leq 1$.

17. A pneumatic tire according to claim 16, wherein the space between mutually adjacent steel filaments of each sheath is not less than 0.02 mm on average but not more than 1.5 times a diameter of the steel filament for penetrating rubber into the inside of the cord.

18. A pneumatic tire according to claim 16, wherein each steel filament has a carbon content of not less than 0.70% by weight and a diameter of 0.15–0.23 mm for improving the cord tenacity.

19. A pneumatic tire according to claim 16, wherein the surface layer to be removed from the inside of the helix in each steel filament is removed by dissolution to a depth equal to 5% of the diameter of the steel filament.

20. A pneumatic tire according to claim 16, wherein the surface layer to be removed from the inside of the helix in each steel filament is removed by dissolution to a depth equal to 10% of the diameter of the steel filament.

21. A pneumatic tire according to claim 16, wherein the steel cords are applied so that a distance between adjoining cords is 0.6–0.9 m in a layer of material as a starting material for the carcass of the tire.

* * * * *